(12) United States Patent
Rimmington

(10) Patent No.: US 9,440,800 B1
(45) Date of Patent: Sep. 13, 2016

(54) CONVEYOR SLIP DETECTION AND CONTROL

(71) Applicant: Joy MM Delaware, Inc., Wilmington, DE (US)

(72) Inventor: Gareth Rimmington, Barnsley (GB)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 14/829,788

(22) Filed: Aug. 19, 2015

(51) Int. Cl.
*B65G 43/04* (2006.01)
*F16D 7/02* (2006.01)
*E21F 13/06* (2006.01)

(52) U.S. Cl.
CPC ............. *B65G 43/04* (2013.01); *E21F 13/066* (2013.01); *F16D 7/02* (2013.01); *B65G 2811/0673* (2013.01)

(58) Field of Classification Search
CPC .................................. F16D 7/02; B65G 34/04
See application file for complete search history.

(56) References Cited

U.S. PATENT DOCUMENTS

| | | | | |
|---|---|---|---|---|
| 2,763,141 A * | 9/1956 | Dodge | ................... | F16D 7/028 464/31 |
| 3,602,346 A * | 8/1971 | Daugherty | .............. | F16D 7/025 192/48.8 |
| 3,989,989 A | 11/1976 | Mayer | | |
| 4,025,832 A | 5/1977 | Jones, III | | |
| 4,366,899 A * | 1/1983 | Doro | ...................... | B65G 13/07 198/781.04 |
| 4,605,107 A * | 8/1986 | Hallidy | .................... | B66D 1/14 192/56.2 |
| 5,954,186 A | 9/1999 | Stroobandt | | |
| 6,715,601 B2 * | 4/2004 | Abel | ....................... | B65G 19/06 198/718 |
| 6,874,606 B1 * | 4/2005 | Heidenreich | ........... | F16D 7/027 192/104 F |
| 8,234,050 B2 * | 7/2012 | Burns | ................... | B60W 10/06 701/67 |
| 8,511,756 B2 * | 8/2013 | Neilson | ................... | E21C 41/26 299/18 |
| 9,109,631 B2 * | 8/2015 | Pfannschmidt | ........... | F16D 7/02 |
| 2013/0068594 A1 * | 3/2013 | Worthington | .......... | B65G 23/44 198/810.04 |
| 2013/0217524 A1 * | 8/2013 | Antchak | .................. | F02B 67/06 474/94 |
| 2013/0268133 A1 * | 10/2013 | Siegfriedsen | ......... | F03D 7/0244 700/287 |
| 2016/0060958 A1 * | 3/2016 | Lehr | ........................ | E21B 4/18 175/26 |

FOREIGN PATENT DOCUMENTS

| | | |
|---|---|---|
| CN | 201424285 Y | 3/2010 |
| CN | 102633097 A | 8/2012 |
| CN | 202609521 U | 12/2012 |

(Continued)

OTHER PUBLICATIONS

Voith, "Torque Limiting Safety Coupling", Voith Turbo Installation and Maintenance Instructions, Edition Mar. 16, 2012, 52 pages, Safeset, Hudiksvall.

*Primary Examiner* — Gene Crawford
*Assistant Examiner* — Thomas Randazzo
(74) *Attorney, Agent, or Firm* — Michael Best & Friedrich LLP (57) ABSTRACT

Conveyor slip detection and control. A controller is operable to receive a first signal from a first sensor, determine a first value for a position of a first portion of a torque limiting device based on the first signal, receive a second signal from a second sensor, determine a second value for a position of a second portion of the torque limiting device based on the second signal, determine a difference between the first value for the position of the first portion and the second value for the position of the second portion, determine an amount of slip between the first portion and the second portion based on the difference, and generate a control signal to control an operation of the conveyor based on the amount of slip.

20 Claims, 7 Drawing Sheets

(56) References Cited

FOREIGN PATENT DOCUMENTS

| CN | 202784731 U | | 3/2013 | | |
| CN | 203211930 U | | 9/2013 | | |
| DE | 2922596 A1 | * | 2/1979 | ............ | B65G 43/04 |
| EP | 0349975 B2 | | 12/1996 | | |
| GB | 703082 A | * | 4/1952 | ............ | B65G 43/04 |
| GB | 726979 A | * | 2/1953 | ............ | B65G 43/04 |
| GB | 738813 A | * | 2/1953 | ............ | B65G 43/04 |
| GB | 731835 A | * | 7/1953 | ............ | B65G 43/04 |
| GB | 770951 A | * | 4/1954 | ............ | B65G 43/04 |
| GB | 805121 A | * | 2/1955 | ............ | B65G 43/04 |
| JP | H06107316 A | | 4/1994 | | |
| JP | 2012071925 A | | 4/2012 | | |
| KR | 20040055854 A | | 6/2004 | | |

* cited by examiner

CONVEYOR SLIP DETECTION AND CONTROL

BACKGROUND

This invention relates a conveyor, such as an armored face conveyor ("AFC") or a beam stage loader ("BSL"), that includes a torque limiting device.

SUMMARY

Longwall mining systems include, among other things, a conveyor such as an AFC or BSL to transport a mined material (e.g., coal) from an area where the material is being mined to an area for processing (e.g., crushing, storage, etc.). Conveyors can include a first sprocket and a second sprocket around which a chain is provided. The chain is driven by one or more drive mechanisms (e.g., a maingate motor, a tailgate motor, etc.), and the movement of the chain around the sprockets causes a conveyor to transport the mined material. The conveyor can include a torque limiting device connected between a drive mechanism and a sprocket. The torque limiting device prevents an excessive (e.g., potentially damaging) torque from being applied to the sprocket or the chain.

The torque limiting device is primarily designed to isolate rotational equipment from abnormal shock loads associated with sudden impacts to reduce the likelihood of chain failures in such situations. The torque limiting device includes an outer sleeve, which can be connected to the sprocket, and an inner shaft, which can be connected to a gearbox or transmission. The outer sleeve is locked onto the inner shaft by hydraulic pressure. When a preset torque value is exceeded, the pressure in the outer sleeve is not sufficient to maintain drive from the inner shaft. As a result, the outer sleeve slips, which allows the inner shaft to continue rotating even though the conveyor chain has stopped. Rotation of the inner shaft and gearbox continues due to electro-magnetic torque, inertial torque generated by the drive mechanism, coupling, and gearbox, etc.

In one embodiment, the invention provides a conveyor for a mining system that includes a sprocket, a torque limiting device, a drive mechanism, a first sensor, a second sensor, and a controller. The torque limiting device includes a first portion and a second portion. The first portion and the second portion are rotatable with respect to one another when a torque limit of the torque limiting device is exceeded. The drive mechanism is coupled through the torque limiting device to the sprocket and is operable to drive the sprocket. The first sensor is operable to generate a first signal related to a position of the first portion of the torque limiting device. The second sensor is operable to generate a second signal related to a position of the second portion of the torque limiting device. The controller includes a processor and a memory. The controller is operable to receive the first signal from the first sensor, determine a first value for the position of the first portion of the torque limiting device based on the first signal, receive the second signal from the second sensor, determine a second value for the position of the second portion of the torque limiting device based on the second signal, determine a difference between the first value for the position of the first portion of the torque limiting device and the second value for the position of the second portion of the torque limiting device, determine an amount of slip between the first portion of the torque limiting device and the second portion of the torque limiting device based on the difference, and generate a control signal to control an operation of the conveyor based on the amount of slip between the first portion of the torque limiting device and the second portion of the torque limiting device.

In another embodiment, the invention provides a method of controlling the operation of a conveyor for a mining system. The method includes receiving a first signal from a first sensor related to a position of a first portion of a torque limiting device, determining a first value for the position of a first portion of the torque limiting device based on the first signal, receiving a second signal from a second sensor related to a position of a second portion of the torque limiting device, and determining a second value for the position of the second portion of the torque limiting device based on the second signal. The method also includes determining a difference between the first value for the position of the first portion of the torque limiting device and the second value for the position of the second portion of the torque limiting device, determining an amount of slip between the first portion of the torque limiting device and the second portion of the torque limiting device based on the difference, and generating a control signal to control an operation of the conveyor based on the amount of slip between the first portion of the torque limiting device and the second portion of the torque limiting device.

In another embodiment, the invention provides a method of controlling the operation of a conveyor for a mining system. The method includes determining a first value for a position of a first portion of a torque limiting device based on a first sensor signal, determining a second value for a position of a second portion of the torque limiting device based on a second sensor signal, determining an amount of slip between the first portion of the torque limiting device and the second portion of the torque limiting device based on a difference between the first value for the position of the first portion of the torque limiting device and the second value for the position of the second portion of the torque limiting device, and generating a control signal to control an operation of the conveyor based on the amount of slip between the first portion of the torque limiting device and the second portion of the torque limiting device.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Independent aspects of the invention will become apparent by consideration of the detailed description and accompanying drawings.

DETAILED DESCRIPTION

The invention described herein relates to the control of a conveyor in a mining system. The conveyor includes, for example, armored face conveyors ("AFCs") or beam stage loaders ("BSLs"). For descriptive purposes, the invention is described herein with respect to embodiments that include AFCs. AFCs include a sprocket, a chain, one or more drive mechanisms (e.g., motors), one or more hydraulic cylinders, and a controller. A torque limiting device is connected between the drive mechanism and the sprocket. The torque limiting device includes an outer sleeve and an inner shaft. The outer sleeve is locked onto the inner shaft by hydraulic pressure. When a preset torque value is exceeded, the pressure in the outer sleeve is not sufficient to maintain drive from the inner shaft and the outer sleeve slips with respect to the inner shaft. The controller is operable or configured to identify or detect the presence of slip in the torque limiting device. Slip is detected using a first sensor and a second sensor. The first sensor is used to monitor the rotation of the outer sleeve of the torque limiting device. The second sensor is used to monitor the rotation of the inner shaft of the torque limiting device. The sensors are, for example, proximity sensors. Targets positioned on the outer sleeve and the inner shaft are detected by the first sensor and the second sensor as the outer sleeve and the inner shaft rotate. The amount of time between detecting the targets is used to calculate the relative rotation of the outer sleeve and the inner shaft. If the amounts of time between detecting the targets on the outer sleeve and the inner shaft are different, slip in the torque limiting device has occurred.

Figure 1:
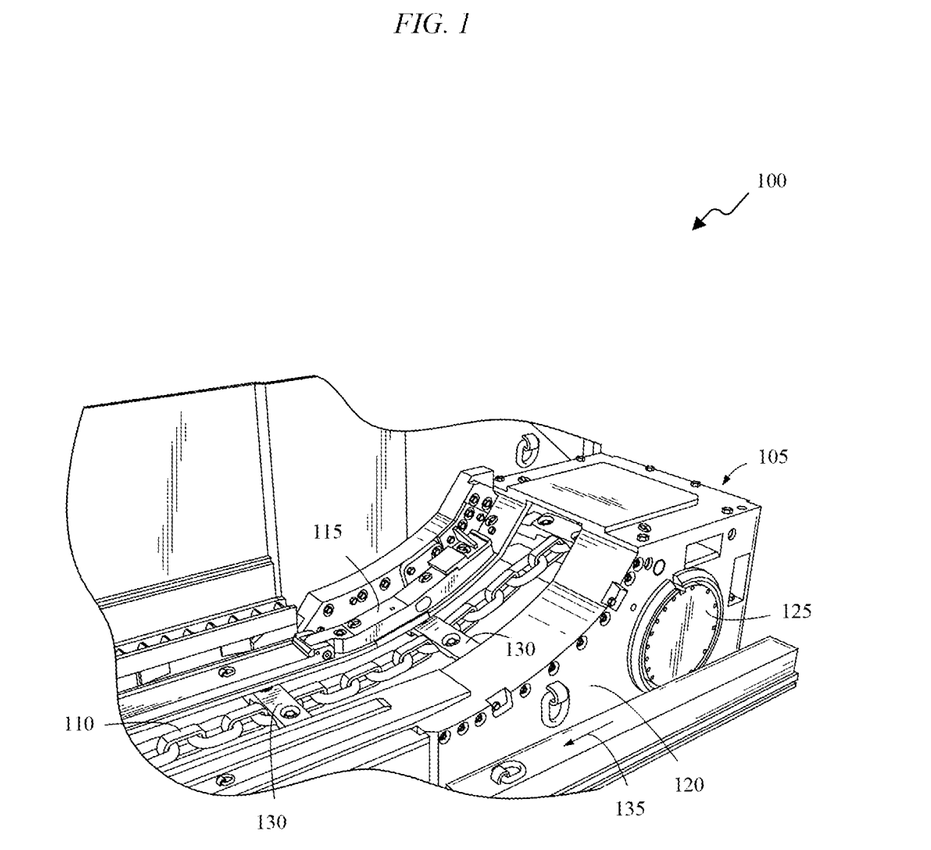
FIG. 1 illustrates a portion of a chain conveyor including an end frame.

FIG. 1 illustrates a portion of a longwall conveyor 100. The conveyor 100 includes a return end 105, a conveying element or chain 110 that travels between the return end 105 and a discharge portion of a longwall mining system, and a sensor assembly 115 proximate to the return end 105. The chain 110 is driven by a drive mechanism, such as a variable speed motor. The return end 105 includes a frame 120, a sprocket or take-up shaft 125 mounted on the frame 120, and at least one hydraulic cylinder (not shown). The frame 120 moves with respect to a discharge portion based on the extension and retraction of the hydraulic cylinder. The chain 110 passes around the take-up shaft 125 to travel in a continuous loop between the discharge portion and the return end 105. The chain 110 includes a plurality of flight members or bars 130 mounted on the chain 110 and spaced apart by a first distance in a direction of travel 135 of the chain 110.

Figure 2:
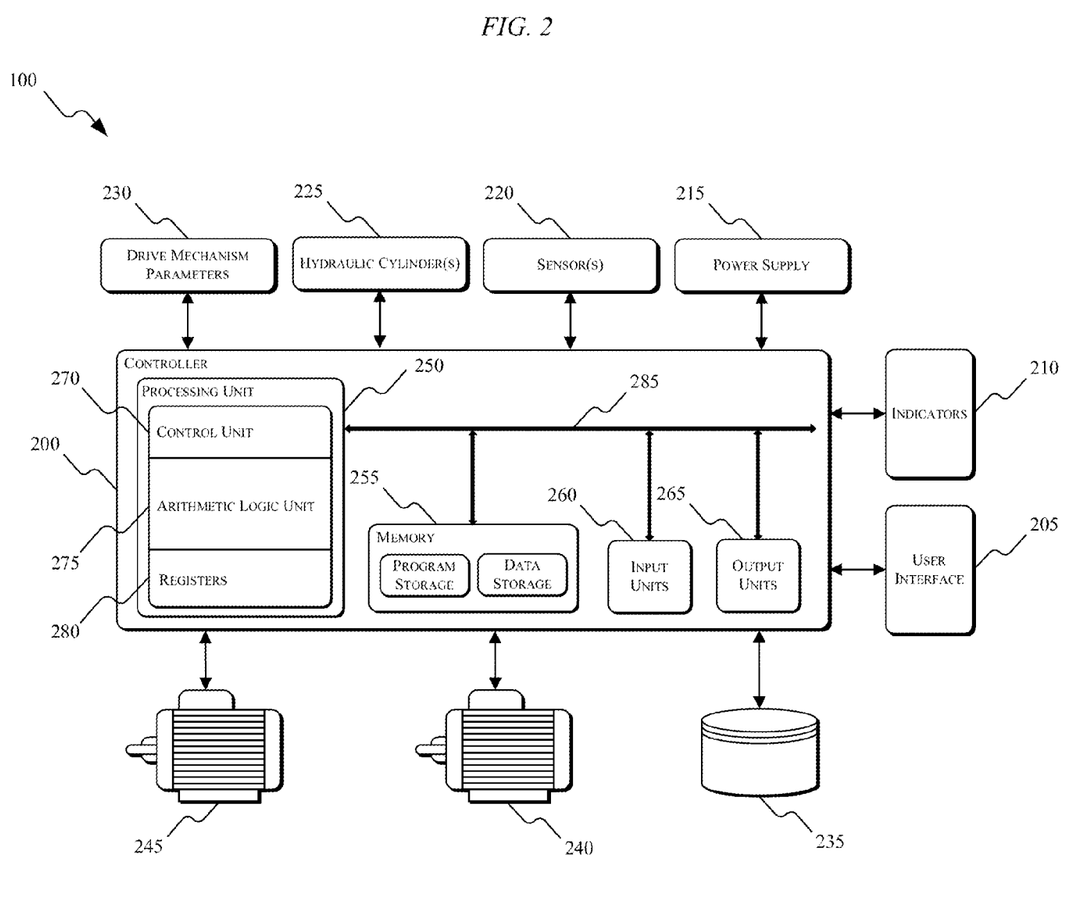
FIG. 2 illustrates a controller for a chain conveyor according to an embodiment of the invention.

FIG. 2 illustrates a controller 200 associated with the conveyor 100. The controller 200 is connected or coupled to a variety of additional modules or components, such as a user interface module 205, one or more indicators 210, a power supply module 215, one or more sensors 220, one or more hydraulic cylinders 225, a drive mechanism or motor parameters module 230, a data store or database 235, a first drive mechanism and drive 240 (e.g., associated with the maingate), and a second drive mechanism and drive 245 (e.g., associated with the tailgate). In some embodiments, the first drive mechanism and drive 240 includes a first motor and a first motor drive, and the second drive mechanism and drive 245 includes a second motor and second motor drive. In some embodiments, a first motor and first motor drive 240 and the second motor and second motor drive 245 each include switchgear assemblies. Embodiments of the invention described herein are described with respect to the drive mechanisms and drives being motors and motor drives. The one or more sensors 220 are, for example, tachometers configured to measure or sense a characteristic of the first sprocket and/or the second sprocket (e.g., a sprocket rotational position, a sprocket rotational speed, a sprocket rotational acceleration, etc.), proximity sensors configured to measure or sense a characteristic of the torque limiting device and/or chain (e.g., a chain position, a chain speed, a chain acceleration, etc.), power transducers within the conveyor 100 configured to measure or sense an electrical characteristic (e.g., current, voltage, power factor, torque, speed, input power, output power, etc.), load cells, etc. The controller 200 includes combinations of hardware and software that are programmed, configured, and/or operable to, among other things, control the operation of the conveyor 100, control the position of the one or more hydraulic cylinders 225, activate the one or more indicators 210 (e.g., a liquid crystal display ["LCD"]), monitor the operation of the conveyor 100, etc.

In some embodiments, the controller 200 includes a plurality of electrical and electronic components that provide power, operational control, and protection to the components and modules within the controller 200 and/or the conveyor 100. For example, the controller 200 includes, among other things, a processing unit 250 (e.g., a microprocessor, a microcontroller, or another suitable programmable device), a memory 255, input units 260, and output units 265. The processing unit 250 includes, among other things, a control unit 270, an arithmetic logic unit ("ALU") 275, and a plurality of registers 280 (shown as a group of registers in FIG. 2), and is implemented using a known computer architecture, such as a modified Harvard architecture, a von Neumann architecture, etc. The processing unit 250, the memory 255, the input units 260, and the output units 265, as well as the various modules connected to the controller 200 are connected by one or more control and/or data buses (e.g., common bus 285). The control and/or data buses are shown generally in FIG. 2 for illustrative purposes.

The use of one or more control and/or data buses for the interconnection between and communication among the various modules and components would be known to a person skilled in the art in view of the invention described herein. In some embodiments, the controller 200 is implemented partially or entirely on a semiconductor chip, is a field-programmable gate array ("FPGA"), is an application specific integrated circuit ("ASIC"), etc.

The memory 255 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices or data structures. The processing unit 250 is connected to the memory 255 and executes software instructions that are capable of being stored in a RAM of the memory 255 (e.g., during execution), a ROM of the memory 255 (e.g., on a generally permanent basis), or another non-transitory computer readable medium such as another memory or a disc. Software and instructions included in the implementation of the conveyor 100 can be stored in the memory 255 of the controller 200. The software includes, for example, firmware, one or more applications, program data, filters, rules, one or more program modules, and other executable instructions. The controller 200 is configured to retrieve from memory and execute, among other things, instructions related to the control processes and methods described herein. In other constructions, the controller 200 includes additional, fewer, or different components.

The drive mechanism or motor parameters module 230 is connected to or associated with the motors and drives 240, 245 that are coupled to the first sprocket and/or the second sprocket. The parameters module 230 is configured to receive signals associated with one or more parameters (e.g., current, voltage, power factor, torque, speed, input power, output power, etc.) of the motors 240, 245. In some embodiments, the parameters module 230 receives signals related to the motor parameters. In other embodiments, the parameters module 230 includes or is connected to the one or more sensors 220 for sensing the motor parameters.

The motors 240, 245 are controlled by control signals received from the controller 200. The motors 240, 245 are also coupled to gear reduction boxes or transmissions to reduce the rotational speed of the motors to a rotational speed appropriate for the sprockets and conveyor 100. In some embodiments, the controller 200 is configured to control the motors 240, 245 and the conveyor 100 autonomously using the sensors 220 and one or more stored programs or modules. In other embodiments, the controller 200 is configured to control the motors and the conveyor 100 based on a combination of manual inputs and automatic controls. The one or more hydraulic cylinders 225 also receive control signals from the controller 200, and selectively extend or retract the return end frame 105 (e.g., change the position of the first sprocket, the second sprocket, etc.) based on the control signals from the controller 200. The controller 200 also monitors the motors and the one or more hydraulic cylinders 225 to determine related characteristics. For example, the controller 200 can monitor or sense electrical characteristics of the one or more motors, the position of the one or more hydraulic cylinders 225 (e.g., an extension of the one or more hydraulic cylinders), etc. Although a single controller 200 is illustrated, in other constructions, the controller 200 may be separated into a plurality of controllers. For example, the controller 200 may be separated into a consolidated control unit ("CCU"), a programmable control unit ("PCU"), etc. The CCU can be housed in an explosion-proof enclosure and provides control over the conveyor system. The PCU is an intrinsically safe system that can be interfaced with the CCU for, among other things, stopping, inhibiting, tripping, etc., the operation of the conveyor 100.

The user interface module 205 is used to control or monitor the conveyor 100 or the mining system. For example, the user interface module 205 is operably coupled to the controller 200 to control the speed of the conveyor, the speed of the one or more motors, etc. The user interface module 205 can include a combination of digital and analog input or output devices required to achieve a desired level of control and monitoring for the conveyor 100. For example, the user interface module 205 can include a display and input devices such as a touch-screen display, one or more knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other constructions, the display is a Super active-matrix OLED ("AMOLED") display. The user interface module 205 can also be configured to display conditions or data associated with the conveyor 100 in real-time or substantially real-time. For example, the user interface module 205 is configured to display measured electrical characteristics of the conveyor 100, the status of the conveyor 100, chain tensions, fault conditions (e.g., slack chain, zero tension chain, etc.), an amount of mined material on the conveyor, etc. In some embodiments, the user interface module 205 is controlled in conjunction with the one or more indicators 210 (e.g., LEDs) to provide visual indications of the status or conditions of the conveyor 100.

Figure 3:
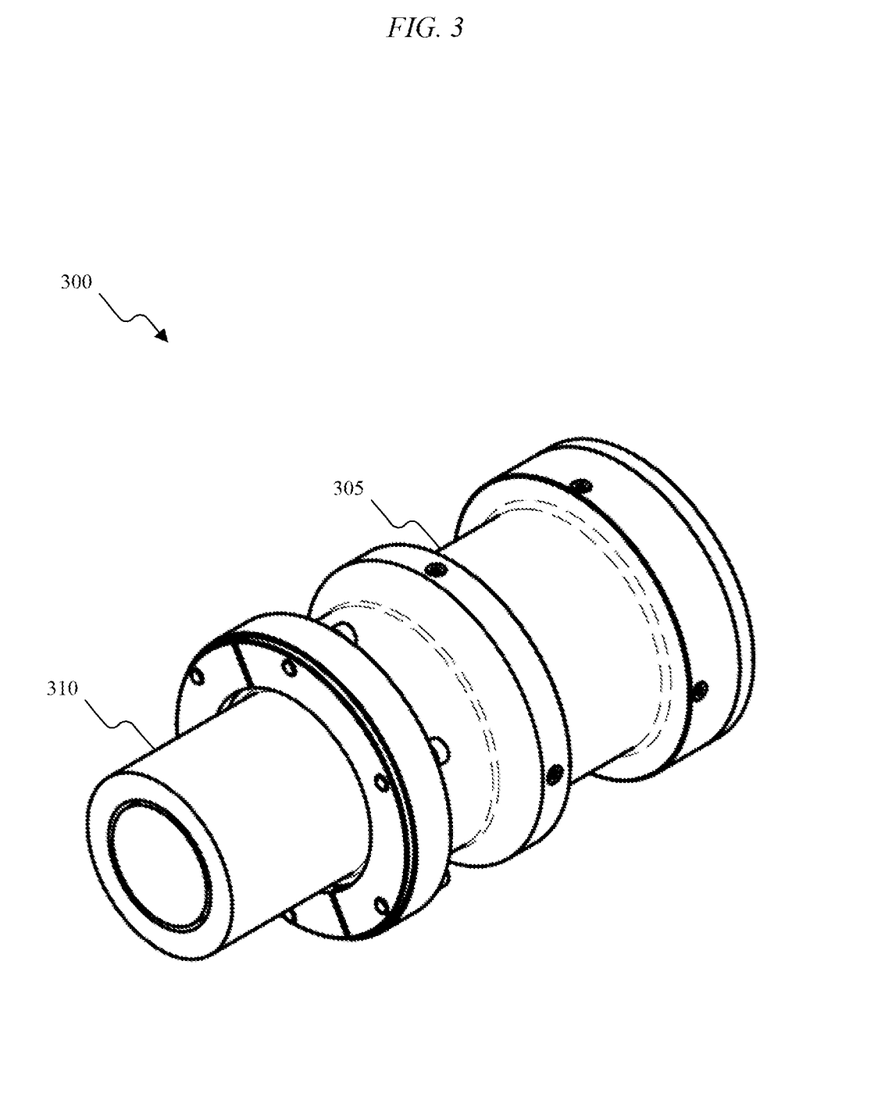
FIG. 3 illustrates a torque limiting device.
Figure 4:
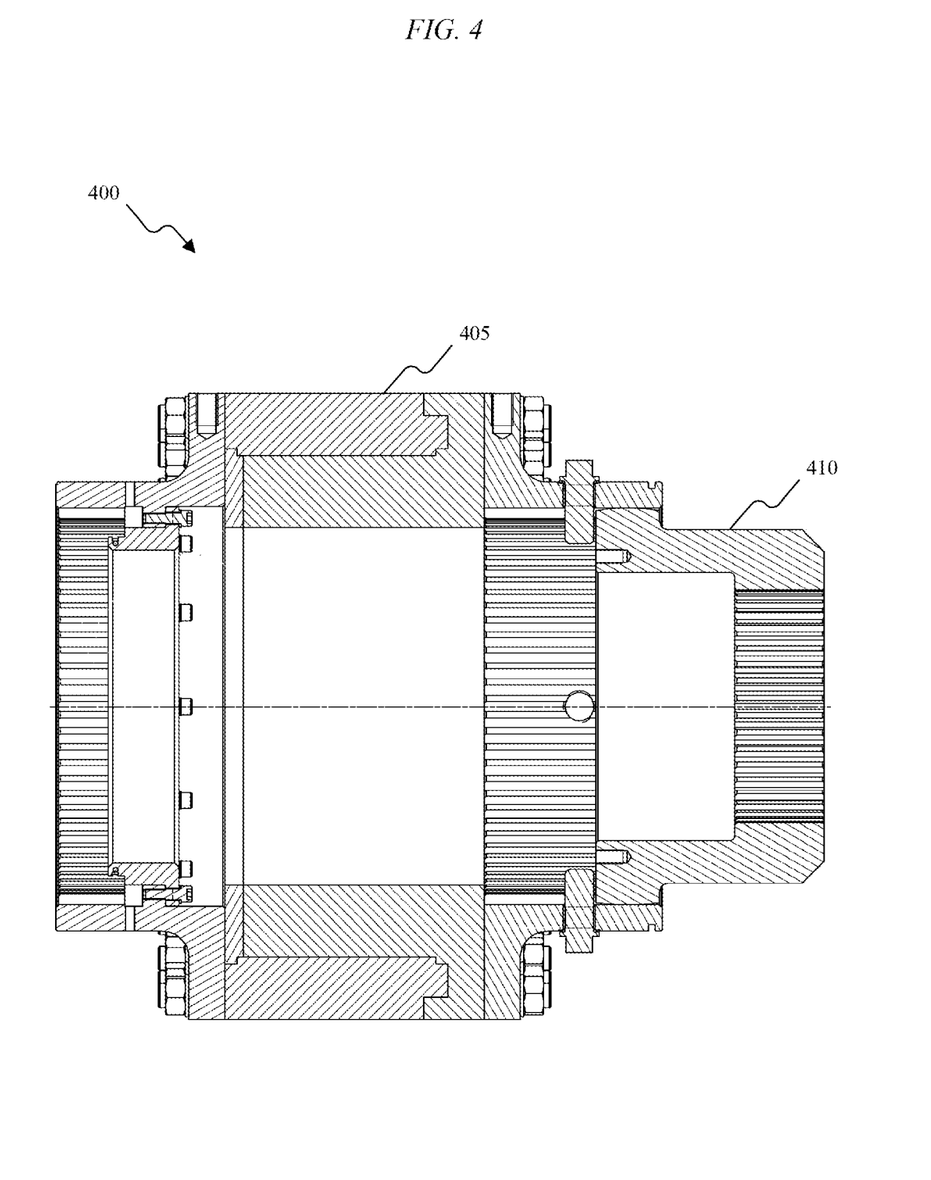
FIG. 4 illustrates another torque limiting device in cross section.

FIG. 3 illustrates an exemplary torque limiting device 300 that includes an outer sleeve 305 and an inner shaft 310. The outer sleeve 305 and the inner shaft 310 are operable to rotate with respect to one another when a torque limit of the torque limiting device 300 is reached. FIG. 4 illustrates another torque limiting device 400 in cross section. As illustrated in FIG. 4, the torque limiting device 400 includes an outer sleeve 405 and an inner shaft 410. Similar to the torque limiting device 300, the outer sleeve 405 and the inner shaft 410 of the torque limiting device 400 are operable to rotate with respect to one another when a torque limit of the torque limiting device 400 is reached. In some embodiments, torque limiting devices used with the conveyor 100 are similar to those sold by Voith Turbo Inc. of York, Pa.

Figure 5:
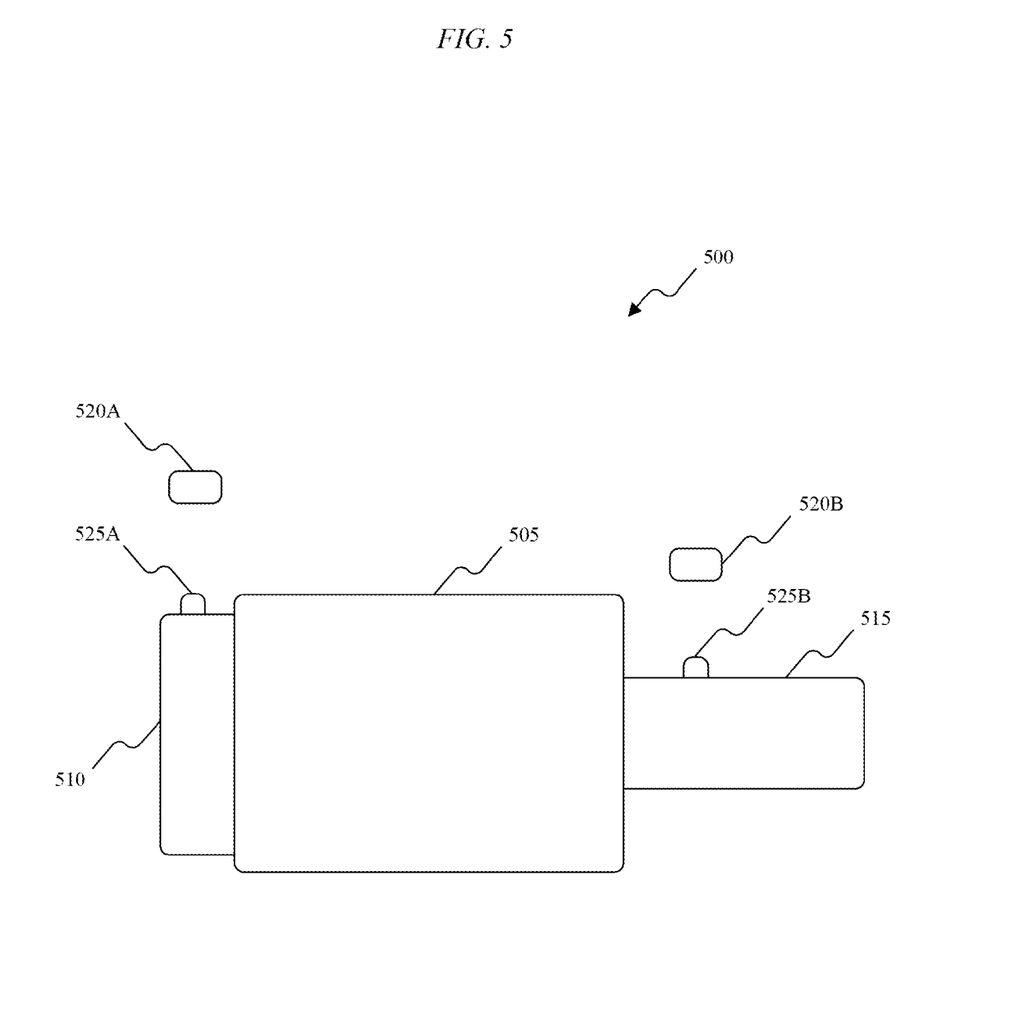
FIG. 5 illustrates a slip detection system according to an embodiment of the invention.
Figure 6:
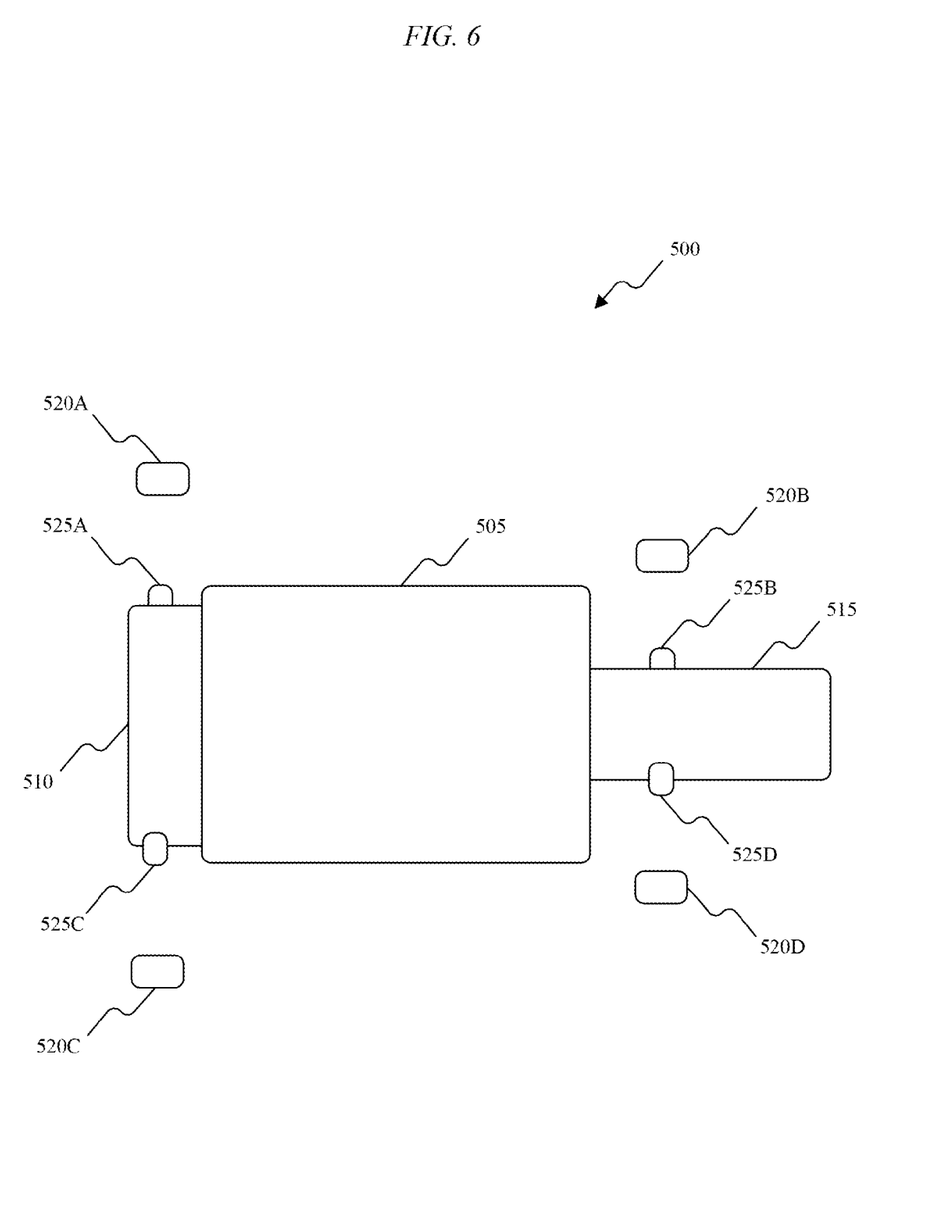
FIG. 6 illustrates a slip detection system according to another embodiment of the invention.

FIG. 5 illustrates a slip detection system 500 that includes a generalized torque limiting device 505. The torque limiting device 505 includes an outer sleeve or first portion 510 and an inner shaft or second portion 515. The outer sleeve 510 and the inner shaft 515 are operable to rotate with respect to one another when a torque limit of the torque limiting device 505 is reached. The slip detection system 500 also includes a first sensor 520A, a second sensor 520B, a first target 525A, and a second target 525B. The first sensor 520A and the second sensor 520B are, for example, proximity sensors that detect the presence of the first target 525A and the second target 525B, respectively. The sensors 520A and 520B generate output signals that are provided to the controller 200. Using the output signals from the sensors 520A and 520B, the controller 200 calculates or determines an angular displacement of the outer sleeve 510 and an angular displacement of the inner shaft 515. The controller calculates or determines the amount of slip between the outer sleeve 510 and the inner shaft 515 based on the amount of time between the sensors 520A and 520B detecting the targets 525A and 525B. In some embodiments, the sensors 520A and 520B output signals to the controller 200 when a target is detected. In other embodiments, the sensors 520A and 520B output signals to the controller 200 continuously or substantially continuously during operation of the conveyor 100 and the signals are evaluated by the controller 200 to determine when a target has been detected. The system 500 of FIG. 5 is illustrated as including one sensor and target for the outer sleeve 510 and one sensor and target for the inner shaft 515. In other embodiments, the system 500 can include additional sensors and/or additional targets. For example, FIG. 6 illustrates the system 500 including a third sensor 520C and a fourth sensor 520D, as well as a third target 525C and a fourth target 525D. The controller 200 receives signals from each of the sensors and can determine an angular displacement of the outer sleeve 510 or inner shaft 515 based on each sensor individually or based on a combination of sensors.

Figure 7:
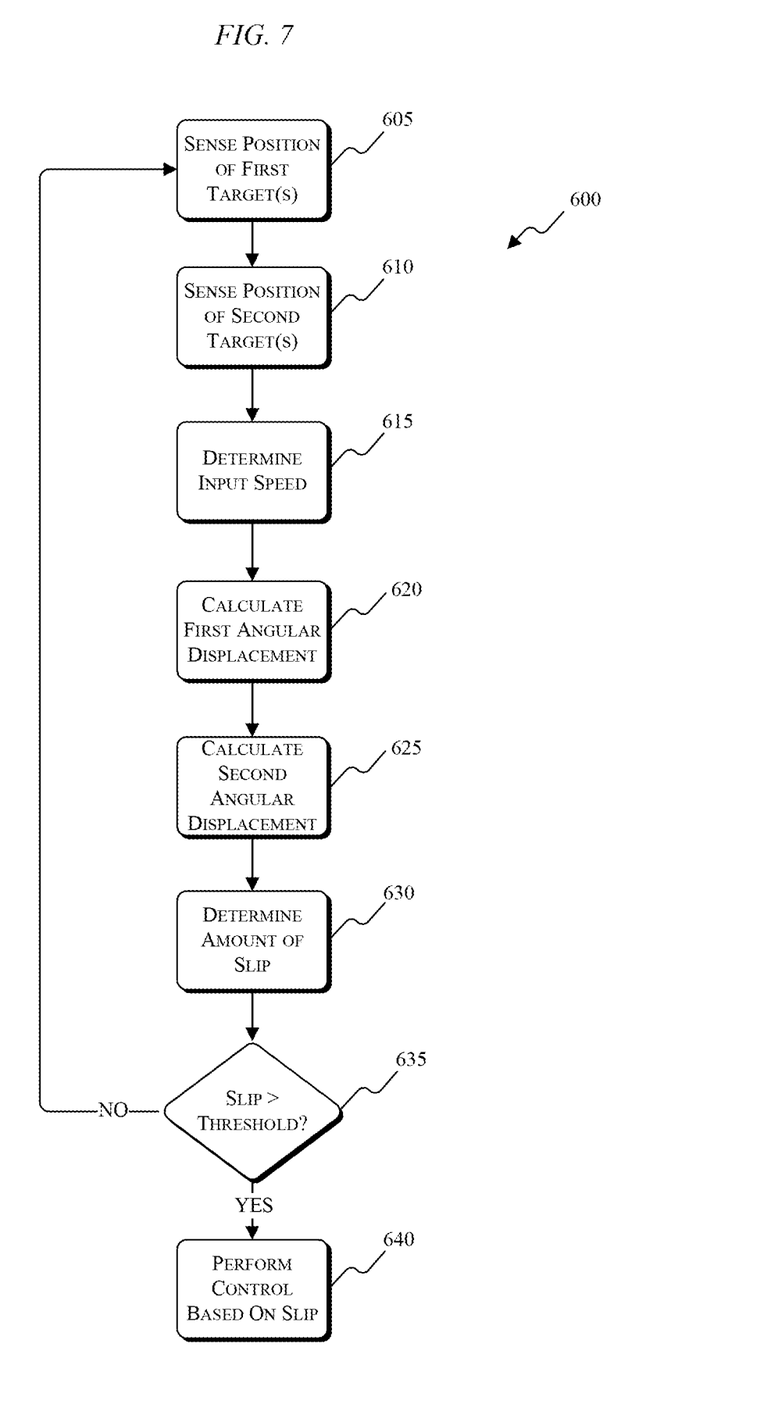
FIG. 7 is a process for detecting slip according to an embodiment of the invention.

A process 600 for identifying or detecting the presence of slip in a torque limiting device and correspondingly performing a control action based on the detected slip is provided in FIG. 7. Various steps described herein with respect to the process 600 are capable of being executed simultaneously, in parallel, or in an order that differs from the illustrated serial manner of execution. The process 600 may also be capable of being executed using fewer steps than are shown in the illustrated embodiment.

The process 600 begins with sensing a position of the first target 525A (step 605). For example, the sensor 520A is located on a fixed portion of the conveyor 100. The target 525A is positioned on the outer sleeve 510 of the torque limiting device 505. As the outer sleeve 510 rotates, the sensor 520A detects the presence of the target 525A as the target 525A passes the sensor 520A. When the sensor 520A detects the presence of the target 525A a second time, the controller 200 is able to determine that the outer sleeve 510 has completed a full rotation (i.e., 360° of rotation). Similarly, at step 610, the position of the second target 525B is sensed. After the position of each of the first target 525A and the second target 525B have been sensed, the controller 200 determines an input speed associated with the conveyor 100. The input speed of the conveyor 100 can be used to determine if slip in the torque limiting device 505 has occurred. The input speed of the conveyor 100 can also be used to determine whether the conveyor 100 is in operation and at what speed the input side of the torque limiting device 505 is expected to be rotating.

At step 620, a first angular displacement of associated with the outer sleeve 510 is determined or calculated. The first angular displacement is calculated or determined based on the number of times the first sensor 520A detects the target 525A passing the first sensor 520A and the amount of time between when the target is detected by the first sensor. The first angular displacement can be measured, for example, with respect to a fixed position of the outer sleeve 510, such as the location of the target 525A, a top-dead-center ("TDC") position of the outer sleeve 510, a startup position of the outer sleeve 510, etc. The first angular displacement can be represented in degrees, radians, meters (e.g., arc length), etc. At step 625, a second angular displacement associated with the inner shaft 515 is determined or calculated. The second angular displacement is calculated or determined based on the number of times the second sensor 520B detects the target 525B passing the second sensor 520B and the amount of time between when the target is detected by the second sensor 520B. The second angular displacement can be measured, for example, with respect to a fixed position of the inner shaft 515, such as the location of the target 525B, a TDC position of the inner shaft 515, a startup position of the inner shaft 515, etc. The second angular displacement can be represented in degrees, radians, meters (e.g., arc length), etc.

Following the determination of the first angular displacement and the second angular displacement, the controller 200 determines or calculates an amount of slip between the outer sleeve 510 and the inner shaft 515 (step 630). The amount of slip can be represented in degrees, radians, meters (e.g., arc length), revolutions, etc. The amount of slip is compared to a threshold value (e.g., zero) (step 635) to determine of the slip that has been detected or calculated is indicative of an over-torque condition. If the amount of slip that has been detected or calculated is less than the threshold at step 635, the process 600 returns to step 605. If, however, the amount of slip that has been detected or calculated is greater than the threshold at step 635, the controller 200 will perform or execute a control operation based on the slip (step 640). In some embodiments, the control operation is turning off the conveyor 100. Turning off the conveyor 100 can include, for example, removing power from a drive motor or actuator, reducing the speed of the drive motor or actuator, reducing a force from the drive motor or actuator, etc. In other embodiments, the control operation includes generating a signal to provide an indication to a user or operator of the presence or amount of slip. For example, the controller 200 is operable or configured to generate a drive signal for a visual indicator (e.g., an LED, an LCD, etc.), a drive signal for an auditory indicator (e.g., a speaker, etc.), a drive signal for a tactile indicator (e.g., a motor), etc. The indication of the presence of slip notifies the user or operator that a corrective action has been or should be taken (e.g., turn off the conveyor, etc.).

Thus, the invention generally provides, among other things, systems, methods, devices, and non-transitory computer readable media for identifying or detecting the presence of slip in a torque limiting device and correspondingly performing a control action based on the detected slip. Various features and advantages of the invention are set forth in the following claims.

What is claimed is:

1. A conveyor for a mining system, the conveyor comprising:
    a sprocket;
    a torque limiting device including a first portion and a second portion, the first portion and the second portion rotatable with respect to one another when a torque limit of the torque limiting device is exceeded;
    a drive mechanism coupled through the torque limiting device to the sprocket, the drive mechanism operable to drive the sprocket;
    a first sensor operable to generate a first signal related to a position of the first portion of the torque limiting device;
    a second sensor operable to generate a second signal related to a position of the second portion of the torque limiting device; and
    a controller including a processor and a memory, the controller operable to
        receive the first signal from the first sensor,
        determine a first value for the position of the first portion of the torque limiting device based on the first signal,
        receive the second signal from the second sensor, determine a second value for the position of the second portion of the torque limiting device based on the second signal, determine a difference between the first value for the position of the first portion of the torque limiting device and the second value for the position of the second portion of the torque limiting device, determine an amount of slip between the first portion of the torque limiting device and the second portion of the torque limiting device based on the difference, and generate a control signal to control an operation of the conveyor based on the amount of slip between the first portion of the torque limiting device and the second portion of the torque limiting device.

2. The conveyor of claim 1, wherein the first sensor and the second sensor are proximity sensors.

3. The conveyor of claim 1, wherein the position of the first portion of the torque limiting device is an angular displacement of the first portion of the torque limiting device and the position of the second portion of the torque limiting device is an angular displacement of the second portion of the torque limiting device.

4. The conveyor of claim 1, wherein the controller is further operable to compare the amount of slip between the first portion of the torque limiting device and the second portion of the torque limiting device to a threshold value.

5. The conveyor of claim 4, wherein the control signal is generated when the amount of slip between the first portion of the torque limiting device and the second portion of the torque limiting device is greater than the threshold value.

6. The conveyor of claim 1, wherein the control signal is operable to remove power from the drive mechanism.

7. The conveyor of claim 1, wherein the control signal generates a visual indication of the amount of slip between the first portion of the torque limiting device and the second portion of the torque limiting device.

8. The conveyor of claim 1, further comprising a first target positioned on the first portion of the torque limiting device and associated with the first sensor, and a second target positioned on the second portion of the torque limiting device and associated with the second sensor.

9. The conveyor of claim 1, wherein the conveyor is an armored face conveyor.

10. A method of controlling a conveyor for a mining system, the method comprising:

receiving a first signal from a first sensor related to a position of a first portion of a torque limiting device;

determining a first value for the position of the first portion of the torque limiting device based on the first signal;

receiving a second signal from a second sensor related to a position of a second portion of the torque limiting device;

determining a second value for the position of the second portion of the torque limiting device based on the second signal;

determining a difference between the first value for the position of the first portion of the torque limiting device and the second value for the position of the second portion of the torque limiting device;

determining an amount of slip between the first portion of the torque limiting device and the second portion of the torque limiting device based on the difference; and generating a control signal to control an operation of the conveyor based on the amount of slip between the first portion of the torque limiting device and the second portion of the torque limiting device.

11. The method of claim 10, wherein the first sensor and the second sensor are proximity sensors.

12. The method of claim 10, wherein the position of the first portion of the torque limiting device is an angular displacement of the first portion of the torque limiting device and the position of the second portion of the torque limiting device is an angular displacement of the second portion of the torque limiting device.

13. The method of claim 10, further comprising comparing the amount of slip between the first portion of the torque limiting device and the second portion of the torque limiting device to a threshold value.

14. The method of claim 13, wherein the control signal is generated when the amount of slip between the first portion of the torque limiting device and the second portion of the torque limiting device is greater than the threshold value.

15. The method of claim 10, wherein the control signal is operable to remove power from a drive mechanism.

16. The method of claim 10, wherein the control signal generates a visual indication of the amount of slip between the first portion of the torque limiting device and the second portion of the torque limiting device.

17. The method of claim 10, wherein the conveyor is an armored face conveyor.

18. A method of controlling a conveyor for a mining system, the method comprising:

determining a first value for a position of a first portion of a torque limiting device based on a first sensor signal;

determining a second value for a position of a second portion of the torque limiting device based on a second sensor signal;

determining an amount of slip between the first portion of the torque limiting device and the second portion of the torque limiting device based on a difference between the first value for the position of the first portion of the torque limiting device and the second value for the position of the second portion of the torque limiting device; and generating a control signal to control an operation of the conveyor based on the amount of slip between the first portion of the torque limiting device and the second portion of the torque limiting device.

19. The method of claim 18, further comprising comparing the amount of slip between the first portion of the torque limiting device and the second portion of the torque limiting device to a threshold value.

20. The method of claim 19, wherein the control signal is generated when the amount of slip between the first portion of the torque limiting device and the second portion of the torque limiting device is greater than the threshold value.

* * * * *